US008086092B2

(12) United States Patent
Ohnishi

(10) Patent No.: US 8,086,092 B2
(45) Date of Patent: Dec. 27, 2011

(54) VIDEO IMAGE RECORDING APPARATUS

(75) Inventor: Shinji Ohnishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1292 days.

(21) Appl. No.: 11/559,096

(22) Filed: Nov. 13, 2006

(65) Prior Publication Data

US 2007/0122106 A1 May 31, 2007

(30) Foreign Application Priority Data

Nov. 15, 2005 (JP) ................. 2005-330884

(51) Int. Cl.
*H04N 5/76* (2006.01)
*H04N 5/92* (2006.01)
(52) U.S. Cl. ...................... 386/291; 386/326
(58) Field of Classification Search ............ 386/46, 386/52, 65, 66, 96, 108, 124–126, 200, 224–226, 386/291, 326, 328–334, 341
See application file for complete search history.

(56) References Cited

U.S. PATENT DOCUMENTS

| 5,946,445 A * | 8/1999 | Peters et al. ............... 386/52 |
| 6,052,507 A | 4/2000 | Niida et al. ............... 386/68 |
| 2002/0102095 A1 | 8/2002 | Koyama ............... 386/96 |
| 2003/0133024 A1 | 7/2003 | Ohnishi ............... 348/231.99 |
| 2004/0101288 A1 | 5/2004 | Ohnishi ............... 386/124 |
| 2004/0120691 A1 | 6/2004 | Ohnishi ............... 386/46 |
| 2006/0062544 A1* | 3/2006 | Southwood et al. ............ 386/46 |
| 2006/0085354 A1* | 4/2006 | Hirai ............... 705/59 |

FOREIGN PATENT DOCUMENTS

| JP | 6-326955 A | 11/1994 |
| JP | 2001-283564 A | 10/2001 |
| JP | 2002-232821 | 8/2002 |
| JP | 2004-336255 A | 11/2004 |
| JP | 2005-38512 A | 2/2005 |
| JP | 2005-174479 A | 6/2005 |
| JP | 2005-253014 A | 9/2005 |
| WO | WO 94/11995 | * 5/1994 |

OTHER PUBLICATIONS

Jul. 13, 2010 Japanese Official Action in Japanese Patent Appln. No. 2005-330884.

* cited by examiner

*Primary Examiner* — Thai Tran
*Assistant Examiner* — Mishawn Dunn
(74) *Attorney, Agent, or Firm* — Fitzpatrick, Cella, Harper & Scinto

(57) ABSTRACT

A video image recording apparatus includes a network interface configured to receive video image data transmitted from an external device; a recording unit configured to record the video image data in a file; a determining unit configured to determine whether or not the external device can record the video image data on a recording medium of the external device; and a discontinuity detection unit configured to detect discontinuity of the video image data. If a record start instruction is detected and it is detected that the external device cannot record the video image data on the recording medium thereof, the recording unit starts a process of recording the video image data in the file.

16 Claims, 6 Drawing Sheets

VIDEO IMAGE RECORDING APPARATUS

BACKGROUND OF THE INVENTION

1. Field of the Invention

The present invention relates to a video image recording apparatus for recording video image data output from a digital video camera and the like.

2. Description of the Related Art

When a conventional digital video camera records captured video images and audio as digital data, it records the data on a magnetic tape such as a DV tape and the like. When data is edited, the digital video camera is connected to a personal computer via an IEEE 1394 serial bus to transfer video image data from a magnetic tape to an editing device. When data is transferred, it is necessary to subject a magnetic tape to reproduction process. For example, when video image and audio data is recorded for 60 minutes on the magnetic tape, reproduction is performed for 60 minutes to transfer video image data to the personal computer.

To shorten the above-mentioned data transfer time, the system described in Japanese Patent Application Laid-open No. 2002-232821 is proposed. According to the system described in Japanese Patent Application Laid-open No. 2002-232821, a digital video camera is connected to an external recording device via an IEEE 1394 serial bus, and the video image and audio data being picked up by the digital video camera is recorded on a recording medium that can be accessed at random directly by the external recording device. In the above-mentioned system, an editing operation using a recording medium that can be accessed at random can be started immediately after the photographing can be started. If the external recording device is a personal computer, the editing operation can be more quickly started. In addition, according to the system, the video image and audio data can be simultaneously recorded on both the magnetic tape in the digital video camera and the recording medium of the external recording device.

The system described in the above-mentioned Japanese Patent Application Laid-open No. 2002-232821 has the following problem.

For example, when video images and audio being recorded on the magnetic tape of the digital video camera are encoded in the MPEG-2 encoding method and the like and recorded on the magnetic tape, it is necessary to make an adjustment such that a discontinuous joint portion cannot occur between the video images and audio already recorded on the magnetic tape and the video images and audio to be recorded on the magnetic tape. For example, an adjustment is made to record a predetermined number of tracks of dummy data or null data between the video images and audio already recorded on the magnetic tape and the video images and audio to be recorded now on the magnetic tape. With this adjustment, there is no recording the video images and audio on the magnetic tape from a halfway position of the video images and audio already recorded on the magnetic tape, thereby preventing the recorded video images and audio from being discontinuously connected.

However, it may happen that some digital video cameras stop an encoding process for the MPEG-2 while the dummy data or the null data are recorded on the magnetic tape. The digital video cameras therefore cannot output video image and audio data therefrom to an external recording device because an encoding process stops until the process of recording the dummy data or the null data on the magnetic tape is completed. At this time, if the video image and audio data being picked up during photographing are recorded in a predetermined file format by the external recording device (for example, a personal computer), then video image and audio data are not output from the digital video camera. Therefore, there occurs the problem that discontinuity of the video image and audio data recorded on the recording medium (hard disk and the like) of the external recording device happens in a file.

In this case, since the video image and audio data output from the digital video camera to the external recording device ends halfway, there occurs the problem that the time stamps in the file are also discontinuous.

SUMMARY OF THE INVENTION

The present invention is directed to overcome the above-described drawbacks and disadvantages. The present invention, for example, prevents or suppresses that the discontinuity of video images and audio occurs in a file when the video images and audio output from the image capture apparatus to the recording medium of the video image recording apparatus connected to the image capture apparatus are recorded.

According to an aspect of the present invention, there is provided a video image recording apparatus comprising: a network interface configured to receive video image data transmitted from an external device; a recording unit configured to record the video image data in a file; a determining unit configured to determine whether or not the external device can record the video image data on a recording medium thereof; and a discontinuity detection unit configured to detect discontinuity of the video image data. If a record start instruction is detected and it is detected that the external device cannot record the video image data on the recording medium thereof, the recording unit starts a process of recording the video image data in the file. If the record start instruction is detected and it is detected that the external device can record the video image data on the recording medium thereof, the recording unit starts a process of recording the video image data in the file after the discontinuity detection unit detects the discontinuity of the video image data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

DESCRIPTION OF THE EMBODIMENTS

Exemplary embodiments, features and aspects of the present invention will now be described in detail below with reference to the attached drawings.

First Exemplary Embodiment of the Present Invention

Figure 1:
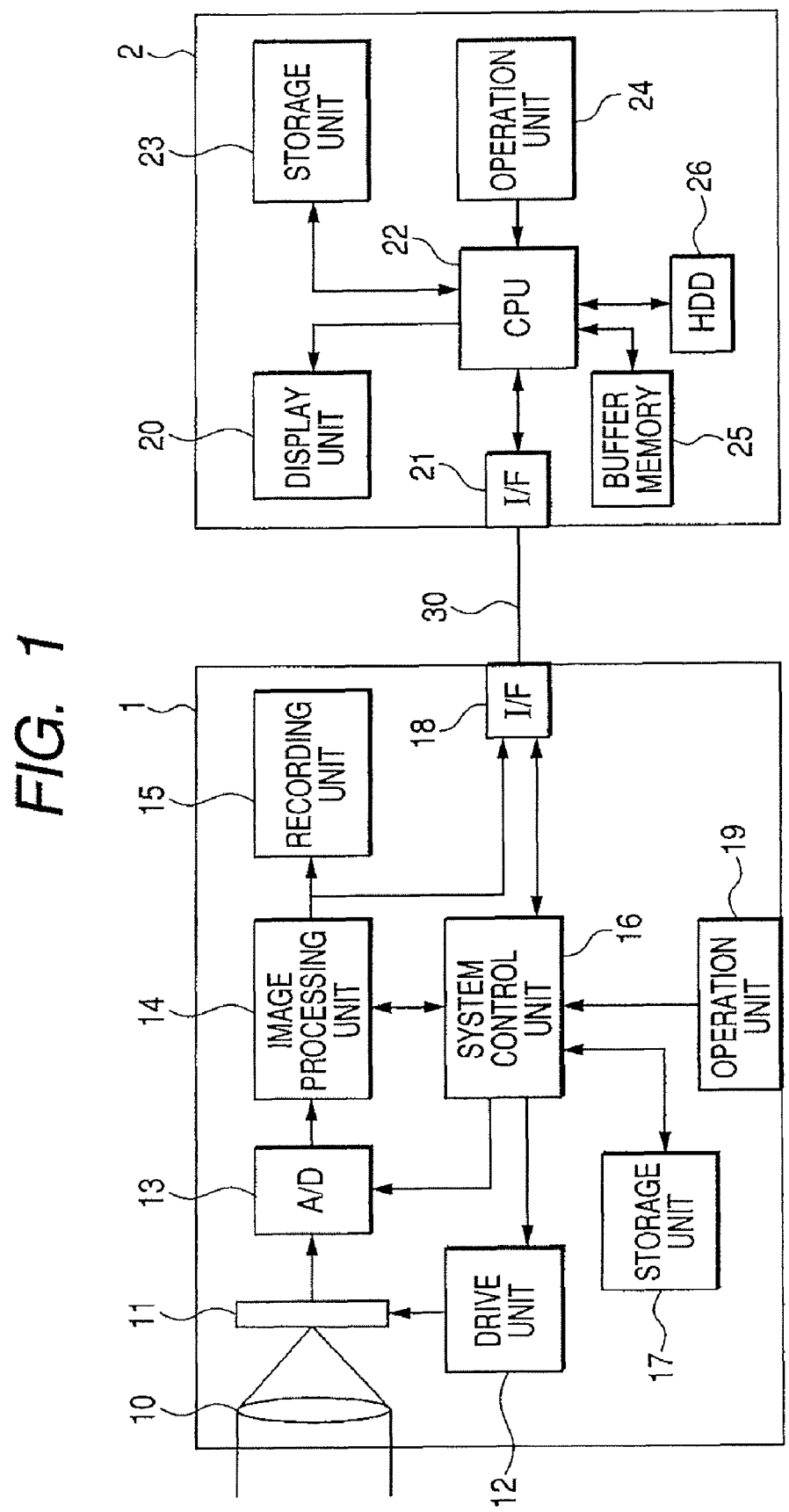
FIG. 1 shows important components of the video image recording system according to the first to fifth exemplary embodiments of the present invention.

FIG. 1 shows important components of the video image recording system according to the first exemplary embodiment of the present invention. The video image recording system in accordance with the first exemplary embodiment of the present invention includes, as shown in FIG. 1, a digital video camera 1 as an example of the image capture apparatus according to the first exemplary embodiment of the present invention, and a PC (personal computer) 2 as an example of the video image recording apparatus according to the first exemplary embodiment of the present invention.

In FIG. 1, the digital video camera 1 has the following components, that is, a lens unit 10 for forming an image of light from an object; an image pickup element 11 for photoelectrically converting the object image formed by the lens unit 10; a drive unit 12 for driving the image pickup element 11; an A/D converter 13 for converting an analog image signal output from the image pickup element 11 into a digital image signal; and an image processing unit 14 for performing image processing on the digital image signal output from the A/D converter 13. In the first exemplary embodiment of the present invention, the image processing unit 14 is assumed to compress and output the input digital image signal in accordance with the MPEG-2 standard. A recording unit 15 records the image-processed digital image signal on the recording medium. In the first exemplary embodiment of the present invention, it is assumed that a magnetic tape is used as the recording medium. A system control unit 16 controls the entire digital video camera 1. A storage unit 17 stores a control program executed by the system control unit 16, an image signal being processed, various parameters for image processing, etc. The storage unit 17 is also used as a work area of the system control unit 16. A network interface 18 is used when the digital video camera 1 communicates with the PC 2. An operation unit 19 is an operation unit such as a button and the like used when a user operates the digital video camera 1.

In FIG. 1, the PC 2 has the following components. A storage unit 23 stores a computer program such as application software and the like. A CPU (central processing unit) 22 performs a process in accordance with the computer program stored in the storage unit 23. A display unit 20 such as a liquid crystal display displays necessary information according to the processing of the CPU. An operation unit 24 can be a keyboard, a mouse, etc. for use by a user inputting necessary information. A network interface 21 is used by the PC 2 to communicate with the digital video camera 1. The network interfaces 18 and 21 are connected to an IEEE 1394 serial bus network 30. Buffer memory 25 temporarily stores video image and audio data input from the network interface 21. A hard disk 26 records video image and audio data. In each exemplary embodiment of the present invention, video image and audio data are recorded on the hard disk 26, but the hard disk 26 can be replaced with large capacity semiconductor memory. The hard disk 26 can also be replaced with a semiconductor memory that can be accessed at random.

In the first exemplary embodiment of the present invention, the digital video camera 1 is connected to the PC 2 via an IEEE 1394 serial bus. The IEEE 1394 serial bus is a high performance serial bus prescribed by the IEEE Std 1394-1995, and has two types of data transfer systems, that is, an isochronous transaction and an asynchronous transaction. The isochronous transaction is used for a real time transfer of video image and audio data, and the asynchronous transaction is used for a transfer of a control signal and the like. The digital video camera 1 outputs video images captured by a camera from the network interface 18 in an isochronous transaction. In the first exemplary embodiment of the present invention, the video image and audio data transferred from the digital video camera 1 to the PC 2 is encoded in accordance with the MPEG-2 standard, but the encoding method is not limited to the MPEG-2 standard.

Figure 2:
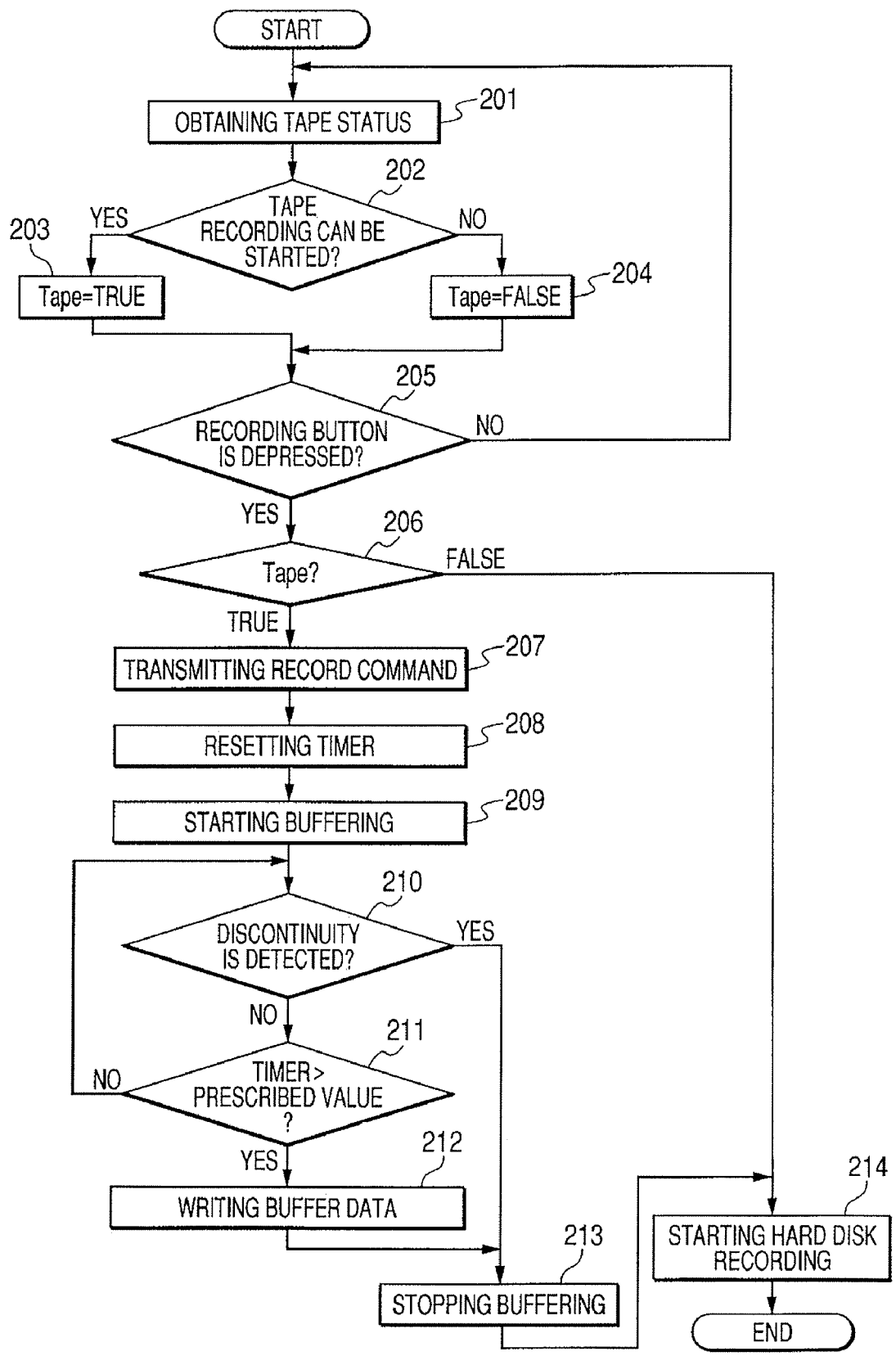
FIG. 2 is a flowchart of an example of the procedure according to the first exemplary embodiment of the present invention.

FIG. 2 is a flowchart showing an example of the processing procedure of the PC 2 connected to the digital video camera 1. The processing procedure shown in FIG. 2 is controlled by the CPU 22 in accordance with the computer program stored in the storage unit 23.

In step 201, the CPU 22 inquires of the digital video camera 1 about a recording status as to whether or not the recording unit 15 can record image and audio signals. The PC 2 transmits an inquiry command to the digital video camera 1 in an asynchronous transaction, and a response value transmitted from the digital video camera 1 to the PC 2 in response to the command can be confirmed, thereby acquiring the status.

In step 202, the CPU 22 confirms an acquired status When it determines that the magnetic tape is in a recording start enabled status, control is passed to step 203, and the internal variable "Tape" is set to TRUE. If it is determined that the magnetic tape is in a recording start disabled status, control is passed to step 204, and the internal variable "Tape" is set to FALSE. The recording start disabled status of a magnetic tape includes a magnetic tape on-recording status.

In step 205, the CPU 22 determines whether or not the record button displayed on the display unit 20 has been depressed in the user operation using the operation unit 24. If the record button has not been depressed, control is returned to step 201. If it is determined in step 205 that a record button has been depressed, the CPU 22 starts the process of recording the input video image and audio data on the hard disk 26.

In step 206, the CPU 22 confirms the status of the internal variable "Tape". In the "Tape=FALSE" status, that is, in the magnetic tape recording disabled status of the digital video camera 1, control is passed to step 214, and the recording of the input video image and audio data on the hard disk 26 is immediately started.

On the other hand, in the "Tape=TRUE" status, that is, in the magnetic tape recording enabled status of the digital video camera 1, control is passed to step 207 to simultaneously record data on the magnetic tape and the hard disk 26. In step S207, the CPU 22 transmits in an asynchronous transaction a RECORD command instructing to start recording data on the magnetic tape to the digital video camera 1.

After transmitting a RECORD command, the CPU 22 passes control to step 208, and resets the internal timer. In step 209, the CPU 22 starts recording the video image and audio data input from the network interface 21 in the buffer memory 25. Since the RECORD command is transmitted to the digital video camera 1 to instruct starting recording on the magnetic tape in step 207, the digital video camera 1 receives the RECORD command, starts adjusting the contents of the process of the image processing unit 14, and stops outputting data from the network interface 18 until the end of the adjustment.

After transmitting the RECORD command, the PC 2 determines whether or not there occurs discontinuity of the video image and audio data input from the network interface 21 in step 210. The discontinuity can be detected by detecting a missing time for a predetermined period in the input video image and audio data, and by detecting the discontinuity in the time stamp of a received data packet. When the discontinuity is detected in step 210, the data buffering in the buffer memory 25 is stopped in step 213, and the recording of the video image and audio data input in step 214 on the hard disk 26 is started. If no discontinuity is detected in step 210, it is determined in step 211 whether or not the value of the internal timer of the PC 2 has exceeded a predetermined prescribed value.

If NO in step 211, then control is returned to step 210, to wait the detection of the discontinuity of the video image and audio data. If the value of the internal timer exceeds a predetermined prescribed value, then the video image and audio data recorded on the buffer memory 25 is recorded on the hard disk 26 in step 212, the data buffering on the buffer memory 25 is stopped in step 213, and the recording of the video image and audio data input from the network interface 21 on the hard disk 26 is started in step 214.

If the value of the internal timer of the PC 2 exceeds a predetermined prescribed value in step 211, it is considered, for example, that there may have been happened that the digital video camera 1 failed to start recording data on the magnetic tape and the contents of the processes in the image processing unit 14 therefore have not been adjusted. In this case, the video image and audio data from the time when the user has depressed the record start button can be continuously recorded on the hard disk 26 by performing the processes in and after step 212.

Thus, according to the first exemplary embodiment of the present invention, when the digital video camera 1 starts recording data on a magnetic tape, a file including no discontinuity of video images and audio can be recorded on the hard disk 26 of the PC 2. If there is no occurrence of the discontinuity of video image and audio data, the video image and audio data from the point when the record button is depressed can be recorded.

Second Exemplary Embodiment of the Present Invention

Described below is the second exemplary embodiment of the present invention as an example of a variation of the first exemplary embodiment of the present invention. Since the second exemplary embodiment of the present invention is an example of a variation of the first exemplary embodiment of the present invention, the explanation of the portion corresponding to the first exemplary embodiment of the present invention is omitted here.

Figure 3:
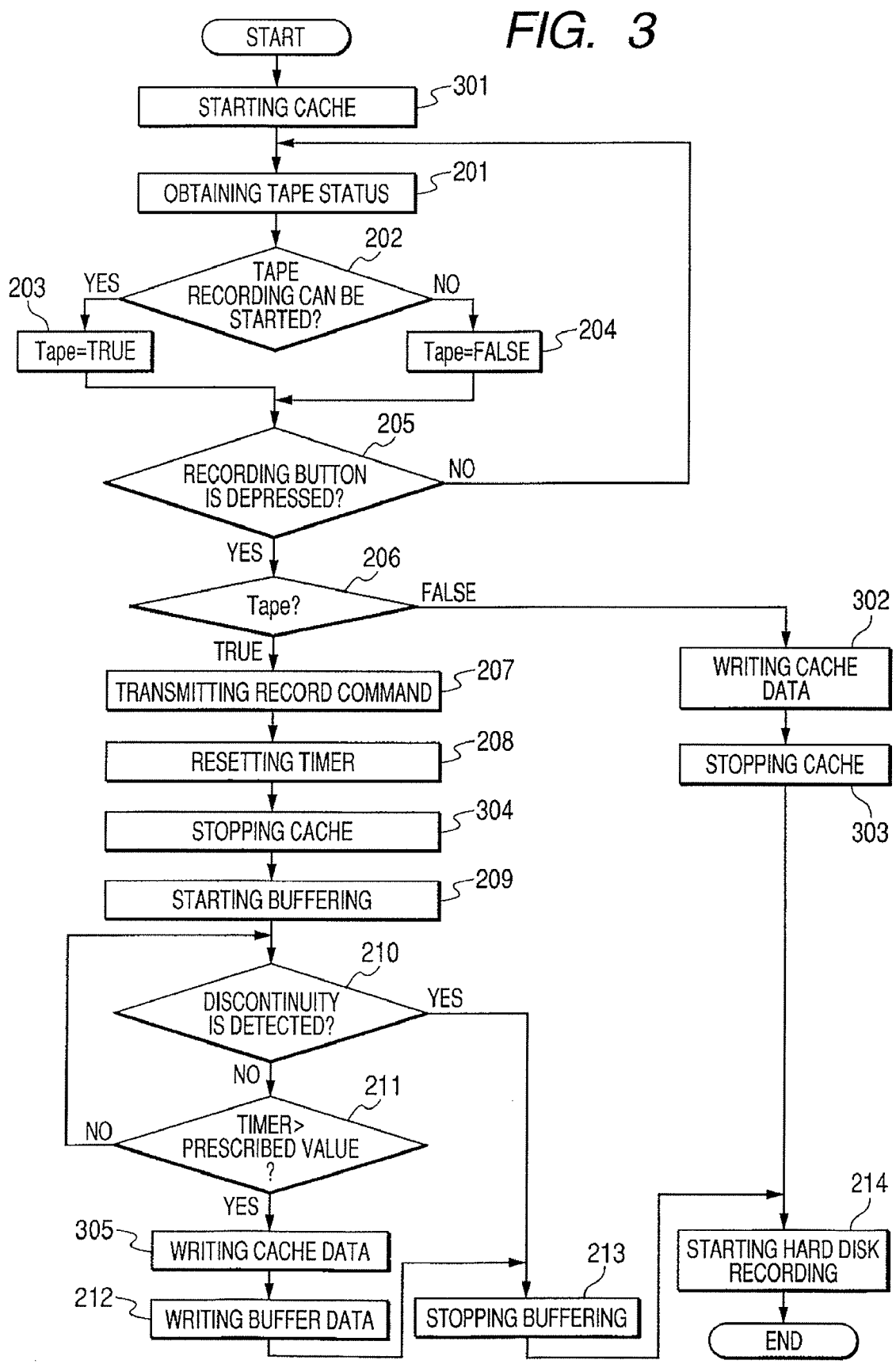
FIG. 3 is a flowchart of an example of the procedure according to the second exemplary embodiment of the present invention.

FIG. 3 is a flowchart showing an example of the procedure of the PC 2 in the second exemplary embodiment of the present invention. In FIG. 3, a step of performing the process similar to that shown in FIG. 2 is assigned the same step number, and the explanation is omitted here. The procedure shown in FIG. 3, as in the procedure shown in FIG. 2, is controlled by the CPU 22 in accordance with the computer program stored in the storage unit 23.

In the second exemplary embodiment of the present invention, the buffer memory 25 shown in FIG. 1 is divided into two areas. The first area is used in recording the video image and audio data input from the network interface 21 for a predetermined period when data is not recorded on the hard disk 26, and is referred to as cache memory in the second exemplary embodiment of the present invention. The cache memory operates as an FIFO (first-in first-out) buffer. The second area is used for a purpose described in the first exemplary embodiment of the present invention, and is referred to as backup memory in the second exemplary embodiment of the present invention. In the second exemplary embodiment of the present invention, a predetermined time for which data is recorded in the first area is 10 seconds.

In step 301, the recording of the video image and audio data input from the network interface 21 is started in the cache memory. As described above, the cache memory can store therein the video image and audio data for 10 seconds at the maximum. After recording the video image and audio data for 10 seconds, the previously recorded data is deleted from the cache memory in the FIFO operation, and new data is recorded. In the above-mentioned operation, the cache memory holds the video image and audio data from the 10 seconds past to the current time point.

If it is determined in step 206 that the recording start disabled status is entered, the video image and audio data stored in the cache memory in step 302 is recorded on the hard disk 26, the recording in the cache memory is stopped in step 303, and the recording of the video image and audio data input from the network interface 21 on the hard disk 26 is started in step 214. According to this operation, the video image and audio data can be recorded on the hard disk 26 continuously from the data of a maximum of 10 seconds past.

If it is determined that the recording on a magnetic tape can be started in step 206, the processes in and after step 207 are performed as explained in the first exemplary embodiment of the present invention, the recording on the cache memory is stopped in step 304, and the recording of the video image and audio data input from the network interface 21 in the backup memory is started in step 209. The video image and audio data recorded in the cache memory and the video image and audio data recorded in the backup memory are continuous data.

When the discontinuity of the video image and audio data input from the network interface 21 is detected in step 210, the data buffering in the backup memory is stopped in step 213, and the recording of the input video image and audio data on the hard disk 26 is started in step 214. If no discontinuity is detected in step 210, it is determined in step 211 whether or not the value of the internal timer of the PC 2 exceeds a predetermined prescribed value.

If it does not exceed the prescribed value, then control is returned to step 210 to wait the detection of the discontinuity of the video image and audio data. If the value of the internal timer exceeds the predetermined prescribed value, the video image and audio data stored in the cache memory in step 305 is recorded on the hard disk 26 in step 305, and the video image and audio data recorded in the backup memory in step 212 is recorded on the hard disk 26. The data buffering in the backup memory is stopped in step 213, and the recording of the video image and audio data input from the network interface 21 on the hard disk 26 is started in step 214.

If the value of the internal timer of the PC 2 exceeds a predetermined prescribed value in step 211, it is considered, for example, that it may have happened that the digital video camera 1 failed to start recording data on the magnetic tape and the contents of the processes in the image processing unit 14 therefore have not been adjusted. In this case, by performing the processes in and after step 305, the video image and audio data can be continuously recorded from a maximum of 10 seconds before the user's depression of the record start button on the hard disk 26.

Thus, according to the second exemplary embodiment of the present invention, when the digital video camera 1 starts recording data on a magnetic tape, a file including no discontinuity of images and audio can be recorded on the hard disk 26 of the PC 2. If there is no occurrence of the discontinuity of video image and audio data, the video image and audio data can be recorded with past video image and audio data of a maximum of 10 seconds before depression of the record button.

Third Exemplary Embodiment of the Present Invention

Described below is the third exemplary embodiment of the present invention as an example of a variation of the first exemplary embodiment of the present invention. Since the third exemplary embodiment of the present invention is an example of a variation of the first exemplary embodiment of the present invention, the explanation of the portion corresponding to the first exemplary embodiment of the present invention is omitted here.

Figure 4:
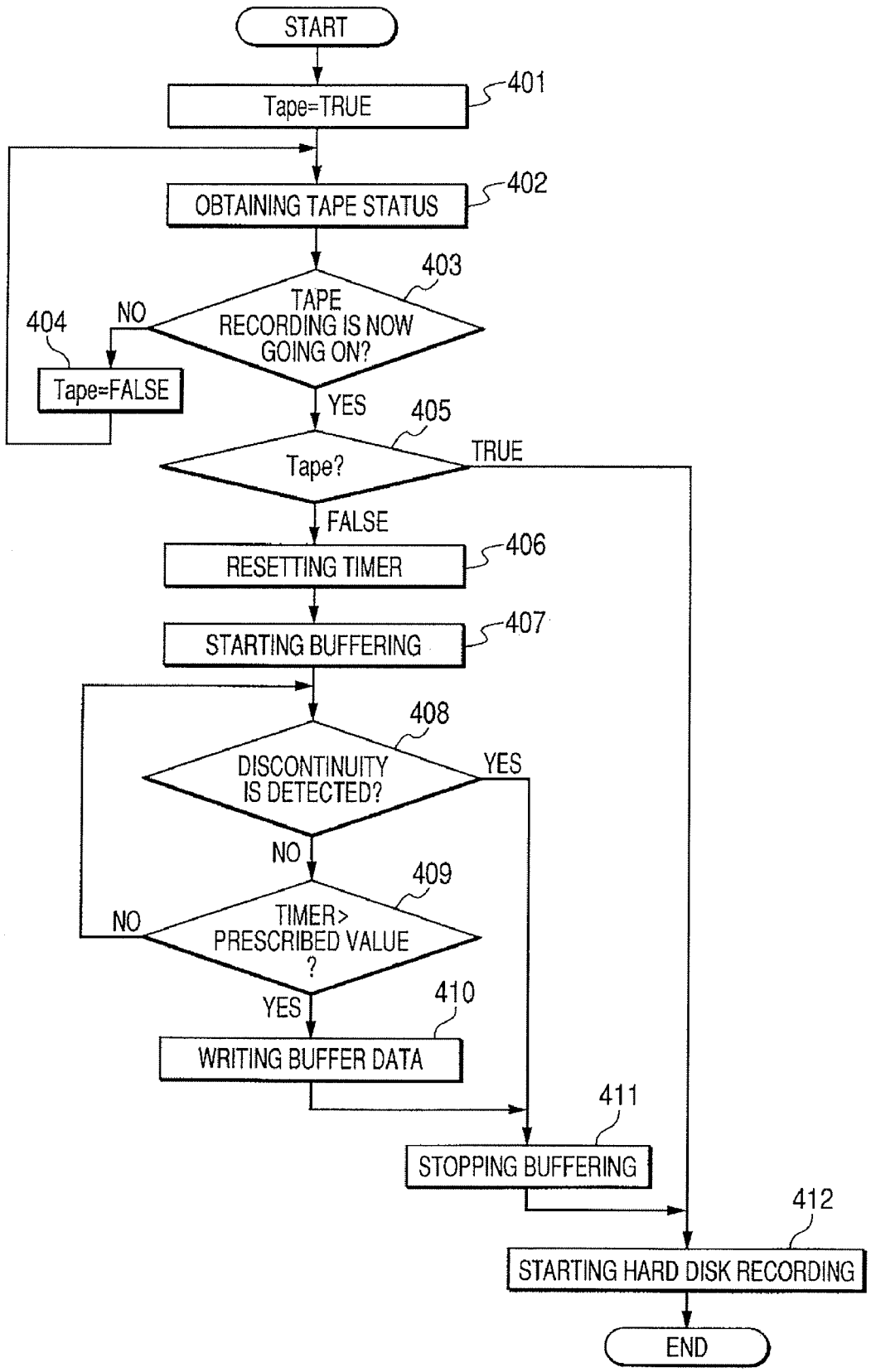
FIG. 4 is a flowchart of an example of the procedure according to the third exemplary embodiment of the present invention.

FIG. 4 is a flowchart showing an example of the processing procedure of the PC 2 in the third exemplary embodiment of the present invention. The PC 2 according to the third exemplary embodiment of the present invention records video image and audio data on the hard disk 26 in synchronization with the record status on the magnetic tape of the digital video camera 1. That is, the recording status of the digital video camera 1 for the magnetic tape is detected, and the recording on the hard disk 26 is started if the status indicates the magnetic tape recording status. The procedure shown in FIG. 4 is controlled by the CPU 22 in accordance with the computer program stored in the storage unit 23.

In step 401, the CPU 22 performs initialization by setting the internal variable "Tape" to TRUE. The internal variable is used as a flag indicating whether or not the recording data on the magnetic tape is being performed.

In step S402, the CPU 22 inquires of the digital video camera 1 about a recording status as to whether or not the recording unit 15 can record image and audio signals. The PC 2 transmits an inquiry command to the digital video camera 1 in an asynchronous transaction, and a response value transmitted from the digital video camera 1 to the PC 2 in response to the command can be confirmed, thereby acquiring the status.

In step 403, the CPU 22 confirms the acquired status. If it is determined that the magnetic tape is in the recording status, control is passed to step 405. Otherwise, control is passed to step 404.

In step 404, the CPU 22 sets the internal variable "Tape" to FALSE, and control is returned to step 402.

If the magnetic tape is in the recording status, the PC 2 starts the process of recording the video image and audio data input from the network interface 21 on the hard disk 26. In step 405, the status of the internal variable "Tape" is confirmed, and if the digital video camera 1 has already entered the magnetic tape recording status in the status "Tape=TRUE", that is, when the PC 2 detects the digital video camera 1, then it immediately starts recording the video image and audio data on the hard disk 26 in step 412. In the state "Tape=FALSE", that is, when the digital video camera 1 has newly started recording data on the magnetic tape, then the internal timer of the PC 2 is reset in step 406, and the recording of the video image and audio data input from the network interface 21 in the buffer memory 25 is started in step 407. In step 408, it is determined whether or not there has occurred the discontinuity of the video image and audio data input from the network interface 21. The discontinuity can be detected by detecting a missing time for a predetermined period in the input video image and audio data, and by detecting the discontinuity in the time stamp of a received data packet. When the discontinuity is detected in step 408, control is passed to step 411. If no discontinuity is detected, control is passed to step 409.

In step 411, the CPU 22 stops data buffering in the buffer memory 25. Then, control is passed to step 412.

In step 409, the CPU 22 determines whether or not the value of the internal timer of the PC 2 exceeds a predetermined prescribed value. If NO, control is returned to step 408, to wait the detection of the discontinuity of the video image and audio data. If the value of the internal timer exceeds a predetermined prescribed value, control is passed to step 410.

In step 410, the CPU 22 records the video image and audio data recorded in the buffer memory 25 on the hard disk 26. Afterwards, the CPU 22 stops data buffering in the buffer memory 25 in step 411.

In step 412, the CPU 22 starts recording the video image and audio data input from the network interface 21 in the hard disk 26.

If the value of the internal timer of the PC 2 exceeds a predetermined prescribed value in step 409, it is considered, for example, that there may have happened that the adjustment of the process contents of the image processing unit 14 has been already completed in the digital video camera 1 when the start of recording data on the magnetic tape is detected in step 403. In this case, the video image and audio data from the time when the user depressed the record start button can be continuously recorded on the hard disk 26 by performing the processes in and after step 410.

Thus, according to the third exemplary embodiment of the present invention, when the digital video camera 1 starts recording data on a magnetic tape, a file including no discontinuity of images and audio can be recorded on the hard disk 26 of the PC 2. If there is no occurrence of the discontinuity of video image and audio data, the video image and audio data from the point when the recording data on the magnetic tape is detected can be recorded.

Fourth Exemplary Embodiment of the Present Invention

Described below is the fourth exemplary embodiment of the present invention as an example of a variation of the first exemplary embodiment of the present invention. Since the fourth exemplary embodiment of the present invention is an example of a variation of the first exemplary embodiment of the present invention, the explanation of the portion corresponding to the first exemplary embodiment of the present invention is omitted here.

Figure 5:
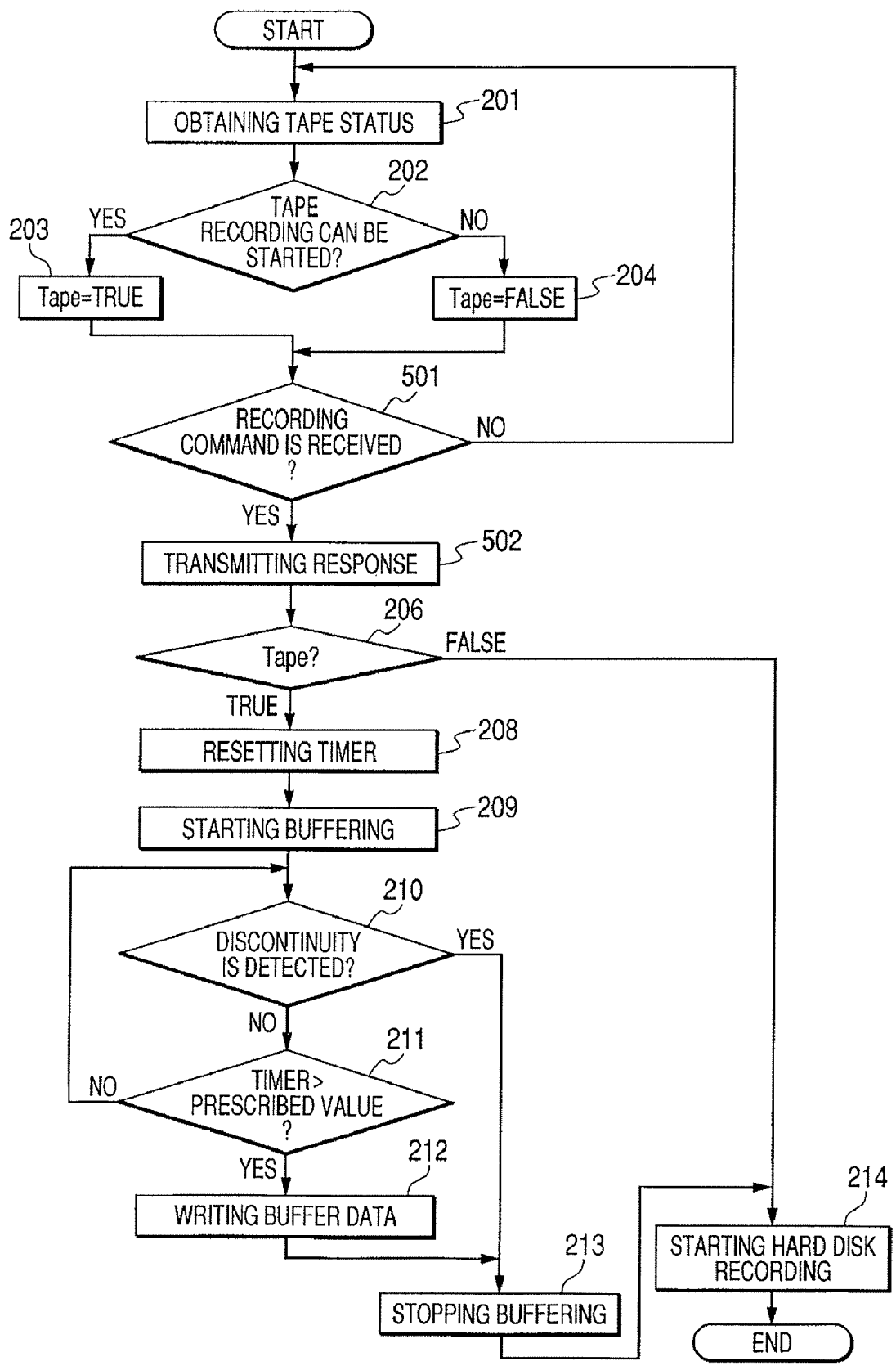
FIG. 5 is a flowchart of an example of the procedure according to the fourth exemplary embodiment of the present invention.

FIG. 5 is a flowchart showing an example of the procedure of the PC 2 in the fourth exemplary embodiment of the present invention. In FIG. 5, a step of performing the process similar to that shown in FIG. 2 is assigned the same step number, and the explanation thereof is omitted here. The processing procedure shown in FIG. 5, as in the processing procedure shown in FIG. 2, is controlled by the CPU 22 in accordance with the computer program stored in the storage unit 23.

The PC 2 according to the fourth exemplary embodiment of the present invention receives a recording start control command from the digital video camera 1, and then starts recording data on the hard disk 26.

The processes from step 201 to step 204 are the same as the processes explained in the first exemplary embodiment of the present invention.

In step 501, the CPU 22 determines whether or not the record command has been received from the digital video camera 1. It is assumed that the operation unit 19 of the digital video camera 1 has a button to specify the start of the recording of data on a magnetic tape. If the button is depressed, the system control unit 16 starts recording data on the magnetic tape, and transmits a record command to the PC 2 connected to the network interface 18.

If it is determined in step 501 that a record command has not been received, since the user does not perform the process of starting recording data on the magnetic tape. Therefore, the CPU 22 returns control to step 201. If it is determined that the record command has been received from the digital video camera 1, the CPU 22 passes control to step 502.

After the CPU 22 transmits a response to the record command to the digital video camera 1 in step 502, the recording of the video image and audio data input from the network interface 21 on the hard disk 26 is started.

The recording processes of the hard disk 26 in and after step 206 are the same as the operation explained in the first exemplary embodiment of the present invention. However, the process in step 207 according to the first exemplary embodiment of the present invention is not performed according to the fourth exemplary embodiment of the present invention.

Thus, according to the fourth exemplary embodiment of the present invention, when the digital video camera 1 starts recording data on a magnetic tape, a file including no discontinuity of images and audio can be recorded on the hard disk 26 of the PC 2. If there is no occurrence of the discontinuity of video image and audio data, the video image and audio data from the point when the user depresses the record button of the digital video camera 1 can be recorded.

Fifth Exemplary Embodiment of the Present Invention

Described below is the fifth exemplary embodiment of the present invention as an example of a variation of the first exemplary embodiment of the present invention. Since the fifth exemplary embodiment of the present invention is an example of a variation of the first exemplary embodiment of the present invention, the explanation of the portion corresponding to the first exemplary embodiment of the present invention is omitted here.

Figure 6:
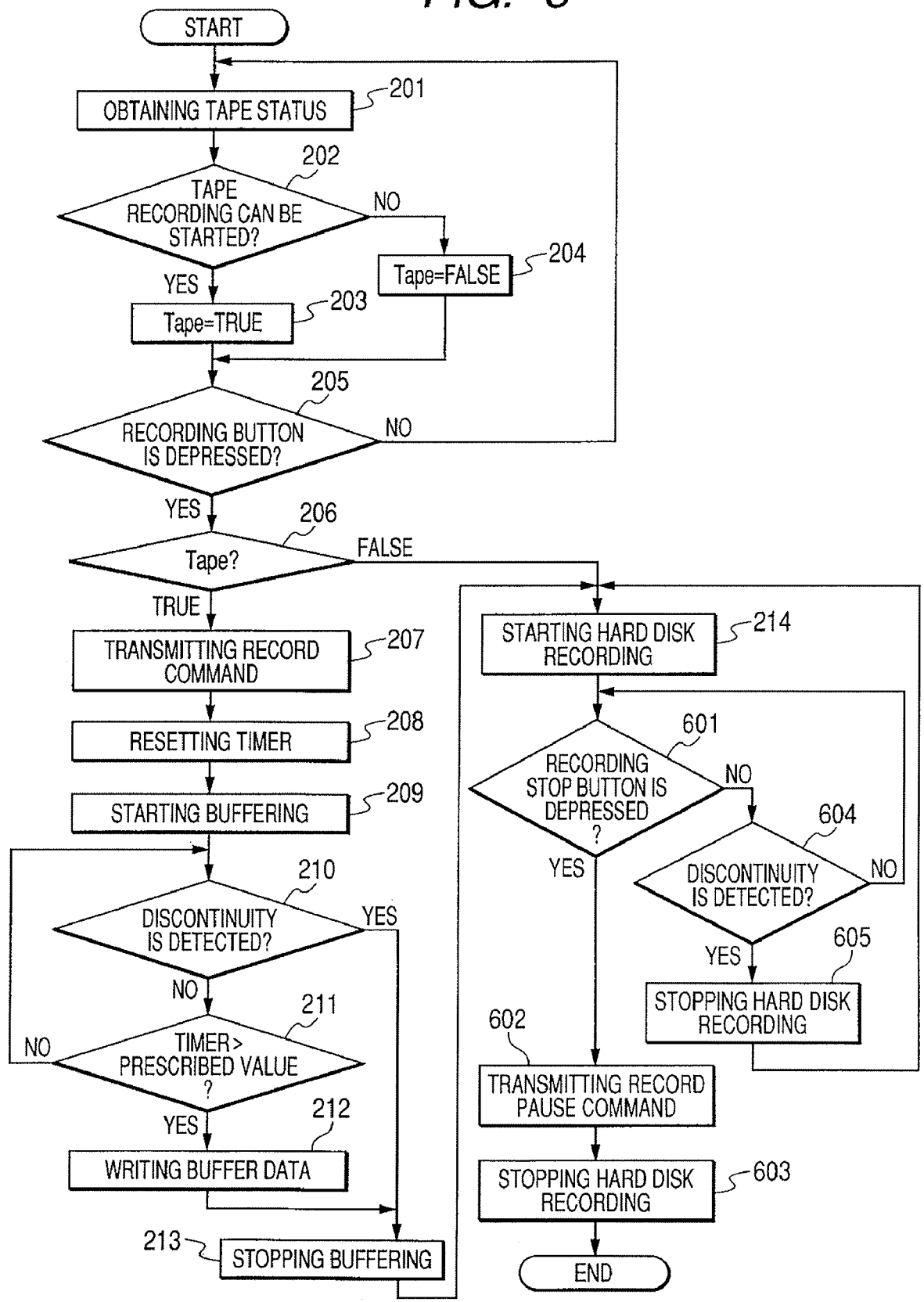
FIG. 6 is a flowchart of an example of the procedure according to the fifth exemplary embodiment of the present invention.

FIG. 6 is a flowchart showing an example of the procedure of the PC 2 in the fifth exemplary embodiment of the present invention. In FIG. 6, a step of performing the process similar to that shown in FIG. 2 is assigned the same step number, and the explanation thereof is omitted here. The procedure shown in FIG. 6, as in the procedure shown in FIG. 2, is controlled by the CPU 22 in accordance with the computer program stored in the storage unit 23.

The PC 2 according to the fifth exemplary embodiment of the present invention divides and records a file when it detects the discontinuity of the video image and audio data received from the network interface during recording the data on the hard disk 26.

The processes from step 201 to step 214 are the processes of starting recording data on the hard disk 26, and are the same as the processes explained in the first exemplary embodiment of the present invention.

In step 601, the CPU 22 determines whether or not the record stop button displayed on the display unit 20 in the user operation of the operation unit 24 has been depressed. If it is determined that the record stop button has been depressed, control is passed to step 602. If it is not determined that the record stop button has been depressed, control is passed to step 604.

In step 602, the CPU 22 performs control such that the RECORD PAUSE command to direct a temporary stop of the recording of data on a magnetic tape can be transmitted to the digital video camera 1 in an asynchronous transaction.

In step 603, the CPU 22 stops recording data on the hard disk 26.

In step 604, it is determined whether or not there is the discontinuity of the video image and audio data input from the network interface 21. The discontinuity can be detected by detecting a missing time for a predetermined period in the input video image and audio data, and by detecting the discontinuity in the time stamp of a received data packet. When the discontinuity is not detected, control is returned to step 601. If the discontinuity is detected, control is passed to step 605.

In step 605, the CPU 22 stops recording data on the hard disk 26, and closes a file of the video image and audio data before detecting the discontinuity. Afterwards, the CPU 22 returns control to step 214, and starts the process of recording video image and audio data after detecting the discontinuity in another file than the closed file.

Thus, according to the fifth exemplary embodiment of the present invention, when the discontinuity occurs in the video image and audio data because the digital video camera 1 starts recording data on the magnetic tape during the recording of data on the hard disk 26, the file can be divided and then recorded on the hard disk 26 before and after occurrence of the discontinuity in the video images and audio, and the discontinuity can be suppressed in each file.

Other Exemplary Embodiments of the Present Invention

The advantage of the present invention is to provide a system or an apparatus with a storage medium storing a program code of the software for realizing the function of the above-mentioned modes for embodying the present invention, and can also be attained by a computer of the system and the like reading the program code from the storage medium and executing it.

In this case, the program code itself read from the storage medium realizes the function of the above-mentioned modes for embodying the present invention.

The storage medium for providing a program code can be, for example, a flexible disk, a hard disk, an optical disk, a magneto optical disk, CD-ROM, CD-R, magnetic tape, non-volatile memory, ROM, etc.

Also a case where, at an instruction of a program code read by a computer, the OS and the like that are operating on a computer perform all or a part of an actual process, and the functions of the above-mentioned modes for embodying the present invention are realized can be included in the present invention.

Furthermore, a case where after a program code read from the storage medium is written to the memory provided for a function expansion unit and the like connected a computer, and at an instruction of the program code, the CPU and the like performs a practical process and the functions of the above-mentioned modes for embodying the present invention is also included in the present invention.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and functions.

This application claims the benefit of Japanese Patent Application No. 2005-330884, filed Nov. 15, 2005, which is hereby incorporated by reference herein in its entirety.

What is claimed is:

1. An image recording apparatus comprising:
a network interface configured to receive image data transmitted from an external device and transmit a command for requesting the external device to start recording the image data on a recording medium;
a recording unit configured to record the image data received from the external device in a file; and
a processor that (a) controls the network interface to transmit the command to the external device and controls the recording unit to record the image data received from the external device in the file if a user instructs the image recording apparatus to start recording the image data and the external device can record the image data on the recording medium, and (b) controls the recording unit to stop recording the image data received from the external device in the file and controls the recording unit to start recording the image data received from the external device in a new file if a discontinuity of the image data is detected after the recording unit starts recording the image data received from the external device in the file and the command is transmitted to the external device via the network interface,
wherein if the user instructs the image recording apparatus to start recording the image data and the external device cannot record the image data on the recording medium, the network interface does not transmit the command from the network interface to the external device and the processor controls the recording unit to record the image data received from the external device in the file.

2. The image recording apparatus according to claim 1, wherein the image recording apparatus detects the discontinuity of the image data using a time stamp added thereto.

3. The image recording apparatus according to claim 1, wherein the image data conforms to an MPEG-2 standard.

4. The image recording apparatus according to claim 1, wherein the external device includes a video camera.

5. A method of controlling an image recording apparatus, the image recording apparatus including (a) a network interface configured to receive image data transmitted from an external device and transmit a command for requesting the external device to start recording the image data on a recording medium and (b) a recording unit configured to record the image data received from the external device in a file, the method comprising the steps of:
controlling the network interface to transmit the command to the external device and controlling the recording unit to record the image data received from the external device in the file if a user instructs the image recording apparatus to start recording the image data and the external device can record the image data on the recording medium; and
controlling the recording unit to stop recording the image data received from the external device in the file and controlling the recording unit to start recording the image data received from the external device in a new file if a discontinuity of the image data is detected after the recording unit starts recording the image data received from the external device in the file and the command is transmitted to the external device via the network interface,
wherein if the user instructs the image recording apparatus to start recording the image data and the external device cannot record the image data on the recording medium, the network interface does not transmit the command from the network interface to the external device and the recording unit is controlled to record the image data received from the external device in the file.

6. The method according to claim 5, further comprising a step of detecting the discontinuity of the image data using a time stamp added thereto.

7. The method according to claim 5, wherein the image data conforms to an MPEG-2 standard.

8. The method according to claim 5, wherein the external device includes a video camera.

9. A non-transitory computer-readable recording medium that stores a program for causing a computer to act as the image recording apparatus according to claim 1.

10. A non-transitory computer-readable recording medium that stores a program for causing a computer to act as the image recording apparatus according to claim 2.

11. A non-transitory computer-readable recording medium that stores a program for causing a computer to act as the image recording apparatus according to claim 3.

12. A non-transitory computer-readable recording medium that stores a program for causing a computer to act as the image recording apparatus according to claim 4.

13. A non-transitory computer-readable recording medium that stores a program for causing a computer to execute the method according to claim 5.

14. A non-transitory computer-readable recording medium that stores a program for causing a computer to execute the method according to claim 6.

15. A non-transitory computer-readable recording medium that stores a program for causing a computer to execute the method according to claim 7.

16. A non-transitory computer-readable recording medium that stores a program for causing a computer to execute the method according to claim 8.

* * * * *